(12) United States Patent
Reyes

(10) Patent No.: US 9,556,675 B2
(45) Date of Patent: Jan. 31, 2017

(54) MOBILE LADDER SUPPORT ASSEMBLY

(71) Applicant: Eutimio Reyes, Homestead, FL (US)

(72) Inventor: Eutimio Reyes, Homestead, FL (US)

( * ) Notice: Subject to any disclaimer, the term of this patent is extended or adjusted under 35 U.S.C. 154(b) by 0 days.

(21) Appl. No.: 14/723,728

(22) Filed: May 28, 2015

(65) Prior Publication Data
US 2016/0348436 A1 Dec. 1, 2016

(51) Int. Cl.
| E06C 7/42 | (2006.01) |
| E06C 9/08 | (2006.01) |
| F16M 11/24 | (2006.01) |
| F16M 11/42 | (2006.01) |
| F16M 11/38 | (2006.01) |
| E06C 7/18 | (2006.01) |

(52) U.S. Cl.
CPC .............. *E06C 9/08* (2013.01); *E06C 7/188* (2013.01); *E06C 7/42* (2013.01); *F16M 11/24* (2013.01); *F16M 11/38* (2013.01); *F16M 11/42* (2013.01)

(58) Field of Classification Search
CPC .............. E06C 7/06; E06C 7/188; E06C 7/48; E06C 7/505; E06C 7/42; E06C 9/08; F16M 11/24; F16M 11/38; F16M 11/42
USPC ..... 248/210, 211, 125.8; 182/107, 108, 109, 182/214, 127, 180.2, 180.3, 103
See application file for complete search history.

(56) References Cited

U.S. PATENT DOCUMENTS

| 1,381,397 | A | * | 6/1921 | Briles | E06C 1/20 182/180.3 |
| 4,923,050 | A | * | 5/1990 | Vitols | E06C 7/42 182/127 |
| 5,121,814 | A | * | 6/1992 | Southern | E06C 7/48 182/111 |
| 6,053,284 | A | * | 4/2000 | Fountain | E06C 7/423 182/180.2 |
| 6,328,330 | B1 | * | 12/2001 | Haaser | B62B 1/20 182/21 |
| 6,851,518 | B1 | * | 2/2005 | Walker | E06C 7/48 182/107 |
| 6,997,283 | B2 | * | 2/2006 | Wollenberg | E06C 7/48 182/107 |
| 2011/0011674 | A1 | * | 1/2011 | Kim | E06C 1/22 182/106 |
| 2014/0246271 | A1 | * | 9/2014 | Davies | E06C 7/16 182/103 |

* cited by examiner

*Primary Examiner* — Nkeisha Smith
(74) *Attorney, Agent, or Firm* — Ruben Alcoba, Esq

(57) ABSTRACT

A mobile ladder support assembly provides stable lateral and rear support, and transportability for operation of a ladder. A lateral support bar restricts lateral tilting by the assembly. A pair of height adjustable rear support bars restrict backwards tilting by the assembly. A pair of caster wheels transport the assembly and the ladder. The wheels ride a pivot bar that rotates in a first direction for a stationary position. When the pivot bar is manipulated towards the second direction, the pair of wheels drop to a mobile position. Springs at the ends of the pivot bar create tension that maintains the pivot bar in the first position. Tabs selectively engage a notches to retain the wheels in the stationary position, or release the wheels to the mobile position. The free rotation and swivel of the wheels creates a center of mass that drop the wheels to the mobile position.

19 Claims, 7 Drawing Sheets

MOBILE LADDER SUPPORT ASSEMBLY

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The present invention is directed to a mobile ladder support assembly that provides stable lateral and rear support, for operation of a ladder. The ladder support assembly also provides a pair of freely rotating and swiveling wheels to enable mobility by the assembly and the adjoined ladder.

The inventor has worked with ladders all of his life. The inventor knew that there are many types of ladders. They are often classified by material of construction, load capacity, function, and design. However, most ladders, in general included a vertical or inclined set of rungs or steps.

The inventor was aware of two types of ladders: rigid ladders that can be leaned against a vertical surface such as a wall, and rope ladders that are hung from the top. However, the inventor recently operated a more automated elevator-type ladder. This ladder used two separate and adjacent ladders to automatically raise and lower a load. The elevator-type ladder generally carried heavier loads than standard ladders.

The inventor recognized a problem in that the heavier loads caused the elevator-type ladder to tile laterally or backwards. The inventor recognized that the elevator-type ladder had a tendency to tip over to the left, right, or backwards. This was common when operating a ladder from a high elevation because the center of mass on the ladder top end is distal from the lower end support offered by the legs of the ladder.

The inventor soon learned that it was problematic to transport the elevator-type ladder between work sites. The ladder had to be dragged, or lifted by two people. This was time consuming and physically demanding.

Through research, the inventor learned that a ladder support could be developed to catch the legs of the ladder. However, the inventor soon realized that the sleeves used to catch the legs of the ladder could not be completely vertical, or the ladder would not be functional for leaning against an elevated object. The inventor decided to angle the sleeves at about 105°.

The inventor also added lateral and rear support bars to provide stability to the left, right, and rear if the ladder. However, uneven surfaces made working on the ladder difficult. The inventor added a height adjustment device to the rear support bars on the assembly. This enabled the inventor to create an even working foundation for the ladder.

The inventor also learned that castor wheels rotated and swiveled freely. The inventor added these types of wheels to the assembly. In this manner, the ladder and assembly could be pushed and pulled in a great latitude of directions. The inventor decided to enable the wheels to retract into a stationary position for when the ladder was operational, and enable the wheels to drop on the ground to a mobile position for hen the ladder was being transported. The center of mass from the caste wheels enabled them to drop easily to the mobile position.

However, the inventor soon discovered that the lateral and rear support bars were obtrusive and bumped into objects during transport. The inventor added hinges to enable the support bars to fold inwardly, and thereby minimize space usage during transport and for optimal stowage.

For the foregoing reasons, there is a mobile ladder support assembly that provides lateral and rear support for a ladder, and also enables mobility of the ladder.

Ladder supports have been utilized in the past; yet none with the present delivery expediting characteristics of the present invention. See U.S. Patent No. 20140041965; U.S. Pat. Nos. 6,250,424; and 8,393,586.

For the foregoing reasons, there is a mobile ladder support assembly that provides stable lateral and rear support, for operation of a ladder. The ladder support assembly also provides a pair of freely rotating and swiveling wheels to enable mobility by the assembly and the adjoined ladder. The assembly leverages a center of mass created by the swiveling and rotating wheels, tensional forces, and restraining tabs and notches to adjustably pivot the wheels between a stationary position and a mobile position.

SUMMARY

The present invention describes a mobile ladder support assembly, hereafter, "assembly" that provides stable lateral and rear supports for operation of a ladder while also providing a pair of free rotating and swiveling wheels that enable great latitude in mobility for the assembly and the adjoining ladder. The caster wheels use a center of mass, tension form a spring, and restraining tabs and notches to adjustably pivot between a stationary position and a mobile position.

While the assembly is in the stationary position, the assembly securely retains the ladder in a substantially upright disposition during use. The assembly holds the ladder at an angle that is effective for climbing the ladder and accessing a higher elevation from the ladder. In one embodiment, the angle is about 75° to the ground surface. The assembly receives the terminus of the legs of the ladder in a pair of sleeves. The sleeves are defined by a sleeve first end and a sleeve second end. The sleeve first end is sized and dimensioned to receive the legs of the ladder in a snug coupling engagement. The sleeve second end includes a flange.

Those skilled in the art will recognize that ladders are prone to tip over sideways, tip over backwards, or slip out from the terminus of the legs. Thus, the assembly provides a lateral support bar, and a pair of rear support bars to help prevent these occurrences. In one embodiment, a lateral support bar is disposed perpendicularly beneath the sleeves. The lateral support bar provides lateral (left and right) support for the ladder to help prevent the ladder from tipping over to the sides. The lateral support bar is defined by a first lateral end and a second lateral end. During transport or storage, each lateral end may fold up, generally parallel to the sleeves. In this manner, space usage is minimized.

Those skilled in the art will recognize that a ladder tipping backwards is common when operating a ladder from a high elevation because the center of mass is distal from the lower supports. Thus, the assembly further comprises a pair of rear support bars that are used to provide this rear support. Each rear support bar comprises a first rear end and a second rear end.

The first rear end of the rear supports are disposed generally perpendicular to the lateral support bars. In one embodiment, the first rear ends are disposed at an obtuse angle of about 105° relative to the sleeves.

The second rear end includes a height adjustment device that is disposed perpendicular to the rear support bar. The height adjustment device is configured to provide grip against the ground surface, and also to height adjust the second end of the rear support bars. In this manner, the rear support bars provides adjustable rear support for the assembly to maintain the ladder at a desired slope and to help prevent the ladder from tipping over backwards. The rear support bars fold inwardly, parallel to the lateral support bar. In this manner, space usage is minimized.

The mobile ladder stand employs a pair of wheels that join with the lateral support bar. In one possible embodiment, the wheels are a pair of swiveling caster wheels. The wheels position approximately at the junction between the sleeves and the lateral support bar. The wheels pivot down onto a ground surface to achieve a mobile position. The wheels may also pivot away from the ground surface, resting on the lateral bar to achieve the stationary position.

In one embodiment, a wheel base fastens the wheel to the lateral support bar. The wheel base includes an axle end and a mount end. The axle end includes an axle that passes through a hole in the wheel. The wheel rolls freely on the axle. The mount end is defined by a plate that fastens to the surface of the lateral support bar. The plate comprises a notch. The notch selectively enables retention of the wheels in the stationary position, and release of the wheels in the mobile position. A fastener, such as a screw may fasten the mount end to the lateral support bar. In one embodiment, the mount end rotates freely while fastened to the lateral support bar.

Those skilled in the art will recognize that the wheel's capacity to swivel freely and rotate freely enables the wheel to fall towards its center of mass. When the wheel falls towards its center of mass, the wheel engages the ground surface, and is thus in the mobile position. A force must be applied to the wheel to pivot away from the ground surface, and thereby to the stationary position.

In one embodiment, a pivot bar extends parallel to the lateral support bar. The pivot bar is defined by a lever, a first pivot bar end, and a second pivot bar end. The first and second pivot bar ends pass through a respective flange that extends from each sleeve. In this manner, the pivot bar extends parallel to the lateral support bar, between the sleeves. The first and second pivot bar ends include a tab that extends outwardly and aligns with the notch in the plate of the wheel base.

A spring and an end cap secure each of the pivot bar ends. The spring from each pivot bar end applies a tension on the pivot bar to rotate the pivot bar in a first direction. The rotation in the first direction presses the tab from each pivot bar end into the respective notch in the plate of the wheel base. This direct application of pressure on the plate of the wheel base retains the wheels off the ground surface, and into the stationary position.

The lever on the pivot bar may be depressed to displace each tab from the respective notch in the plate of the wheel base. When the tab disengages from the notch, the center of mass from the wheel base rotates the pivot bar in a second direction, and thereby drops the wheel to the ground surface, and into the mobile position. It is significant to note that the weight of the wheel, especially the free moving center of mass of a freely rotating and swiveling caster wheel, is especially effective for weighing down on the wheel to drop to the mobile position.

Once the wheel base is engaged with the ground surface, the weight of the ladder rests directly on the wheel base. However, the wheels are not forced towards the stationary position because the notch engages the wheel base, and restricts it from pivoting up to the stationary position. The lever may be depressed to rotate the pivot bar, and thereby displace the notch, such that the tension in the springs rotates the pivot bar in the first direction, and thereby the stationary position.

One objective of the present invention is to provide a stable support for a ladder while working form a high elevation.

Another objective of the present invention is to enable the assembly and the ladder to be pushed in a straight line with wide turns.

Another objective of the present invention is to enable the assembly and the ladder to be first pushed laterally and to provide sharp turns.

Yet another objective of the present invention is to provide a pair of sleeves that are sized and dimensioned to receive the legs of the ladder.

Yet another objective is to enable easy conversion between the stationary position and the mobile position by manipulation of the lever on the pivot bar.

Yet another objective is to create sufficient tension on the pivot bar with the pair of springs, such that the pair of wheels are retained in the stationary position until the lever is depressed to disengage the tab from the notch.

Yet another objective is to enable the assembly to be leveled on an uneven ground surface by rotatable adjustment of the height adjustment device.

Yet another objective is to provide an inexpensive to manufacture, and easy to use ladder support assembly.

DRAWINGS

These and other features, aspects, and advantages of the present invention will become better understood with regard to the following description, appended claims, and drawings where:

FIG. 1A is the mobile ladder support assembly in a stationary position, and FIG. 1B is the mobile ladder support assembly in a mobile position;

FIG. 2A is an upper angle perspective view of the mobile ladder support assembly in the stationary position, and FIG. 2B is a lower angle perspective view of the mobile ladder support assembly in the stationary position;

FIG. 3A is an upper angle perspective view of the mobile ladder support assembly in the mobile position, and FIG. 3B is a lower angle perspective view of the mobile ladder support assembly in the mobile position;

Figure 5:
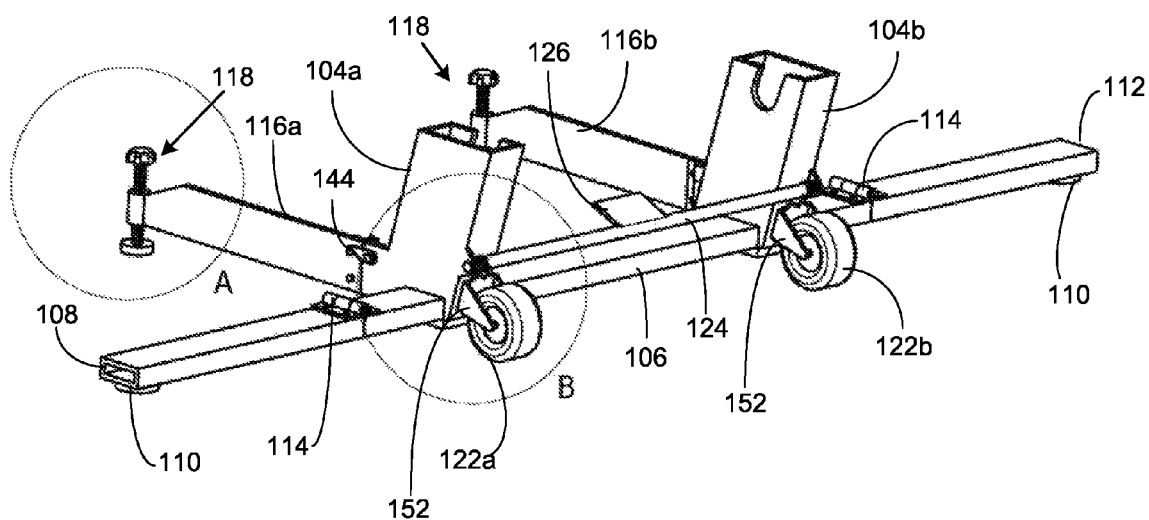
Figure 6A:
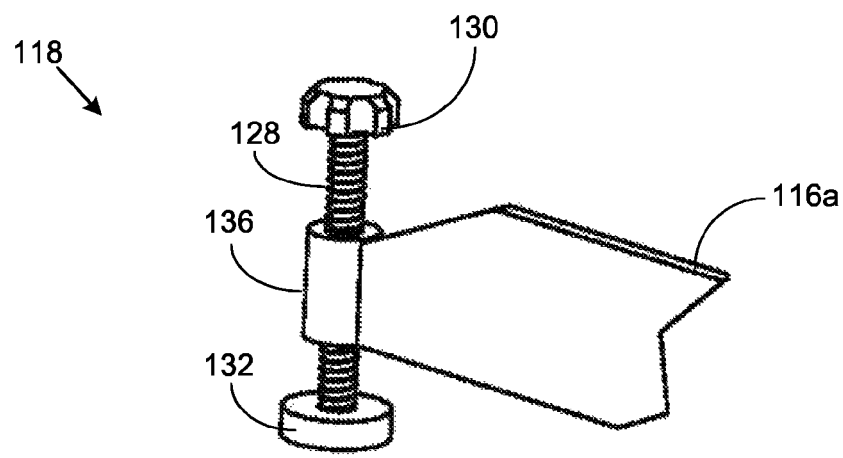
Figure 6B:
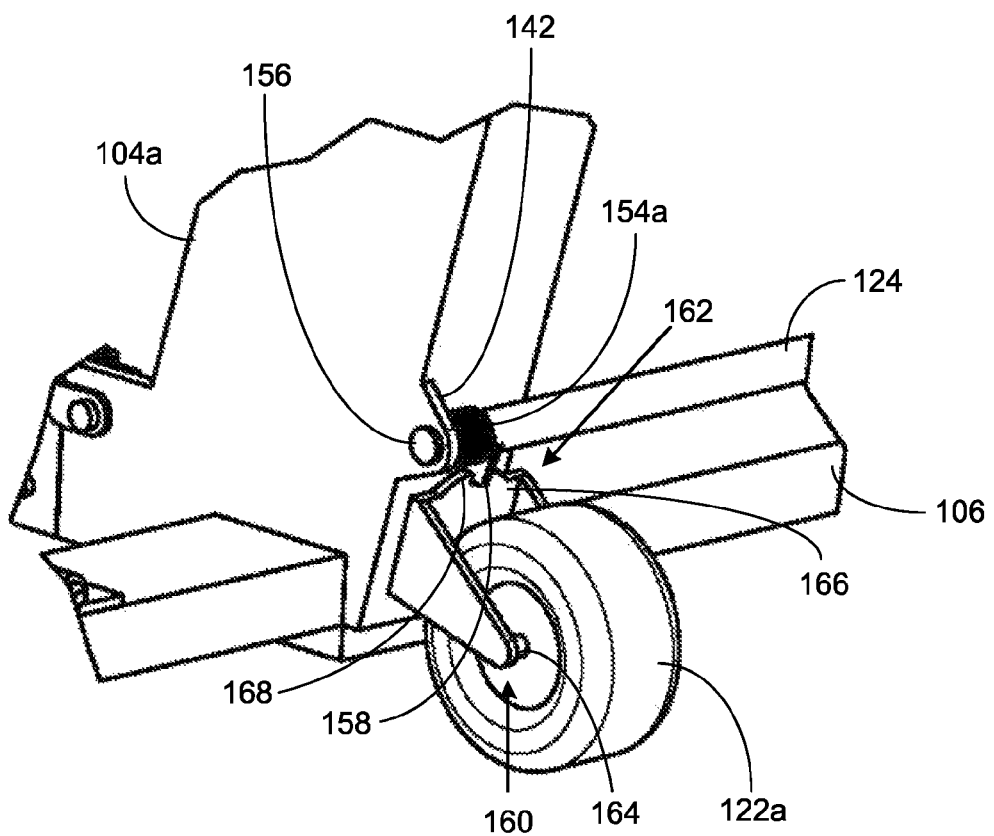

FIG. 5 is a perspective view of the mobile ladder support assembly in the mobile position; and FIGS. 6A and 6B are close-up views of an exemplary height adjustment device and an exemplary wheel base, where FIG. 6A is a view of the height adjustment device, the section taken along section A-A of FIG. 5, detailing a threaded rod, an adjustment end, and a base end, and where FIG. 6B is a view of the wheel base, the section taken along section B-B of FIG. 5, detailing the plate, the notch, the axle, and the tab.

DESCRIPTION

The present invention is directed to a mobile ladder support assembly 100 that provides stable lateral and rear support, for operation of a ladder 200. The ladder support assembly 100 also provides a pair of freely rotating and swiveling wheels 122a-b to enable mobility by the assembly 100 and the adjoined ladder 200. The assembly 100 leverages a center of mass created by the swiveling and rotating wheels 122a-b, tensional forces, and restraining tabs and notches to adjustably pivot the wheels 122a-b between a stationary position and a mobile position.

In one embodiment, the mobile ladder support assembly 100, hereafter, "assembly 100", includes a lateral support bar 106 that restricts lateral tilting by the assembly 100. The assembly 100 further includes a pair of rear support bars 116a-b that restrict backwards tilting by the assembly 100. The pair of rear support bars 116a-b may be height adjustable to compensate for an uneven ground surface.

The assembly 100 provides a pair of wheels 122a-b for transporting the assembly 100 and the adjoined ladder 200. The pair of wheels 122a-b may include a pair of caster wheels that rotate and swivel freely. The generally free movement of the wheels 122a-b creates a center of mass that enables the wheels 122a-b to adjustably pivot from a stationary position 102 to a mobile position 104. The wheels 122a-b ride a pivot bar 124 that rotates in a first direction to disengage the wheels 122a-b from the ground surface, and thereby form the stationary position for the assembly 100. When the pivot bar 124 is rotated towards the second direction, the pair of wheels 122a-b engage the ground surface, and thereby, the assembly 100 is in the mobile position for transporting the assembly 100 and the adjoined ladder 200.

A pair of springs 154a-b position on the ends of the pivot bar 124. The springs 154a-b generate tension that maintains the pivot bar 124 in the first position. A pair of tabs 158 extend from the pivot bar 124. The tabs 158 rotate with the pivot bar 124 to selectively engage a pair of notches 168 in a wheel base 152. When the tabs 158 engage the respective notch 168, the wheels are held into place in the stationary position 102. Conversely, when the tabs 158 disengage from the respective notches 168, the center of mass generated by the freely rotating and swiveling wheels 122a-b enable the pivot bar 124 and the wheels 122a-b to drop to the mobile position. Suitable materials for the assembly 100 may include, without limitation, steel, aluminum, iron, metal alloys, and wood.

Figures 1A, 1B:
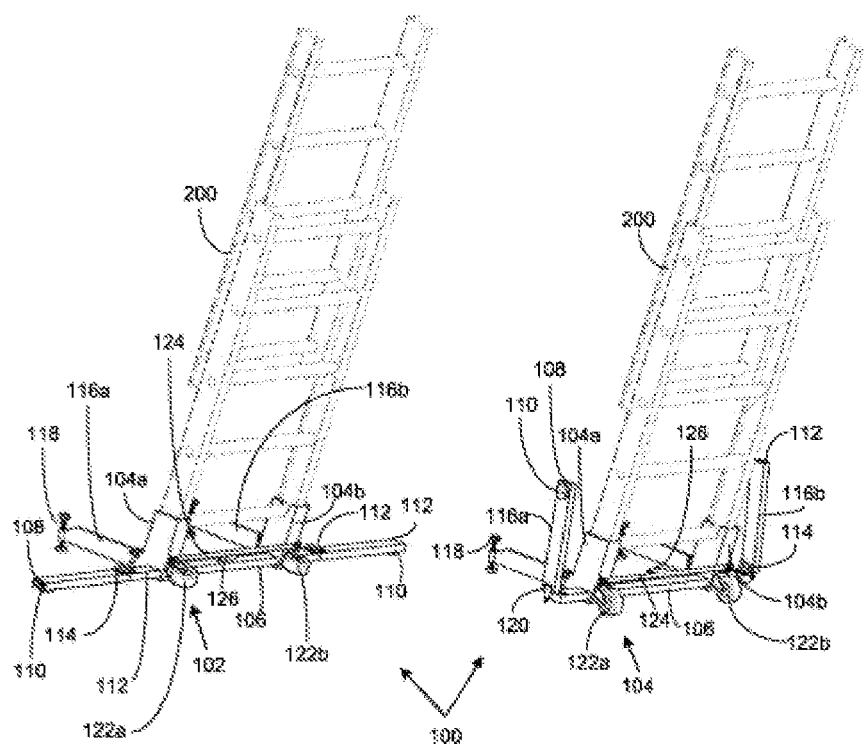
FIGS. 1A and 1B are perspective views of an exemplary mobile ladder support assembly carrying an exemplary ladder, where

FIG. 1A illustrates the assembly 100 in the stationary position 102. From the stationary position 102, the assembly 100 securely retains the ladder 200 in a substantially upright disposition during use. The assembly 100 holds the ladder 200 at an angle that is effective for climbing the ladder 200 and accessing a higher elevation from the ladder 200.

FIG. 1B illustrates the assembly 100 in the mobile position 104. The mobile position 104 of the wheels 122a-b enables three modes of operation for the assembly 100. A first mode provides stability while climbing the ladder 200. For example, a block can be braced against the wheels 122a-b, whereby the ladder is still operable, even in the mobile position 104. A second mode permits the assembly 100 and the ladder 200 to be pushed in a straight line with wide turns. A third mode of operation permits the assembly 100 and the ladder 200 to be first pushed laterally and to provide sharp turns. In any case, because the wheels 122a-b may include caster wheels 122a-b that are generally free swiveling, the assembly 100 has great latitude in mobility.

Figure 2A:
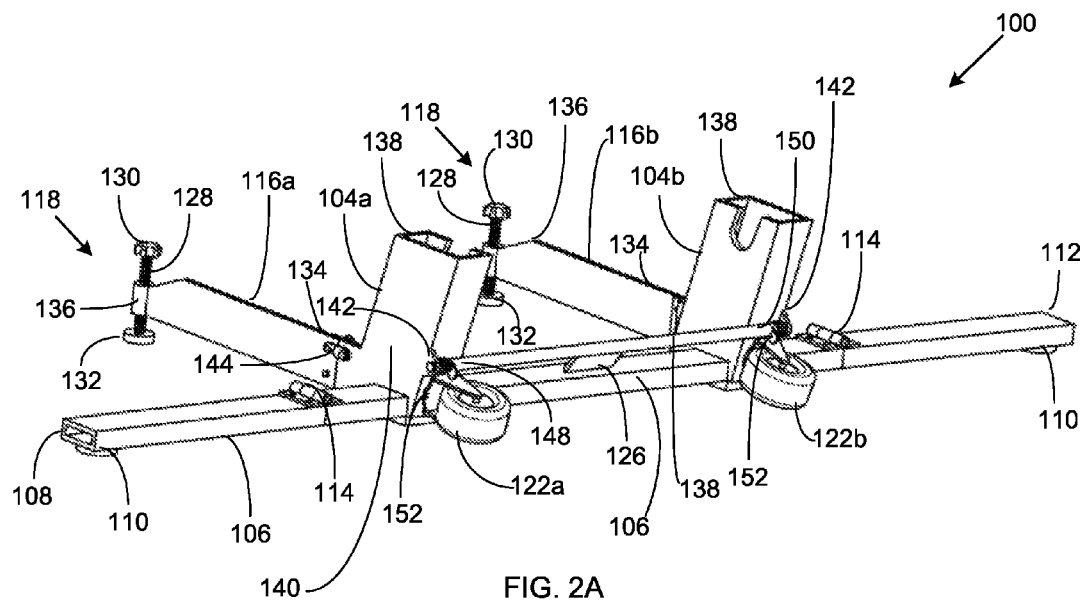
FIGS. 2A and 2B are perspective views of the mobile ladder support assembly, where
Figure 2B:
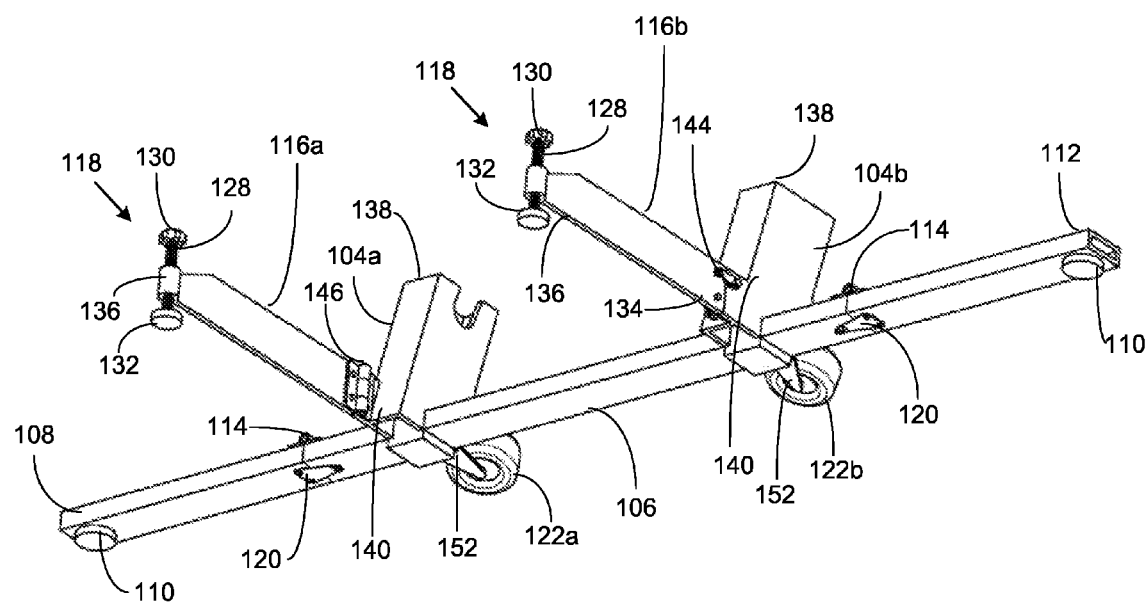

Turning now to FIGS. 2A and 2B, the assembly 100 may receive the terminus of the legs of the ladder 200 in a pair of sleeves 104a-b. The sleeves 104a-b hold the ladder 200 at a slight angle. In one embodiment, the angle is about 75° to the ground surface. Though other angles may be possible in different embodiments. The sleeves 104a-b are defined by a sleeve first end 138 and a sleeve second end 140. The sleeve first end 138 is sized and dimensioned to receive the legs of the ladder 200 in a snug coupling engagement. In one embodiment, the sleeve first end 138 is generally rectangular. The sleeve second end 140 includes a flange 142. The flange 142, as described below, provides a base for the pivot bar 124 to pass through.

Figure 3A:
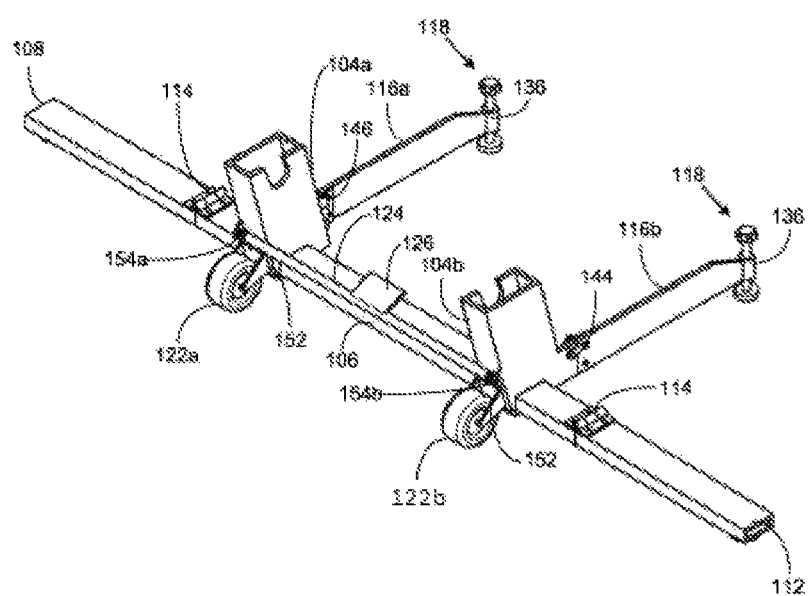
FIGS. 3A and 3B are perspective views of the mobile ladder support assembly, where
Figure 3B:
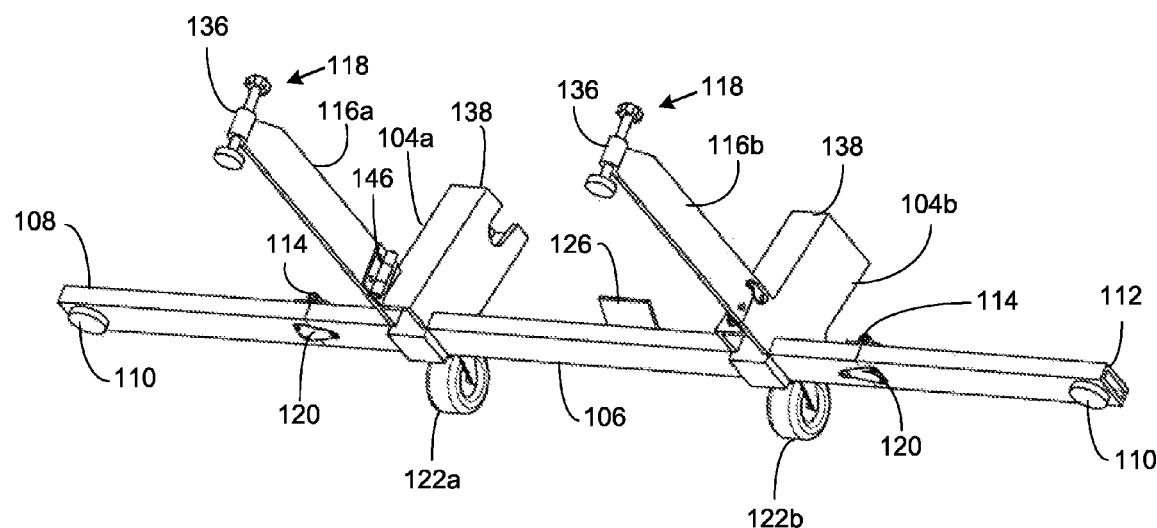

Those skilled in the art will recognize that ladders 200 are prone to tip over sideways, tip over backwards, or slip out from the terminus of the legs. Thus, the assembly 100 provides a lateral support bar 106, and a pair of rear support bars 116a-b to help prevent these occurrences. In one embodiment shown in FIG. 3A, a lateral support bar 106 is disposed perpendicularly beneath the sleeves 104a-b. The lateral support bar 106 provides lateral (left and right) support for the ladder 200 to help prevent the ladder 200 from tipping over to the sides. The lateral support bar 106 is defined by a first lateral end 108 and a second lateral end 112. The first lateral end 108 includes a lateral grip 110 for enhancing the stability of the lateral support bar 106 (FIG. 3B). The lateral grip 110 may include a rubber panel that is configured to grip the ground surface.

Figure 4:
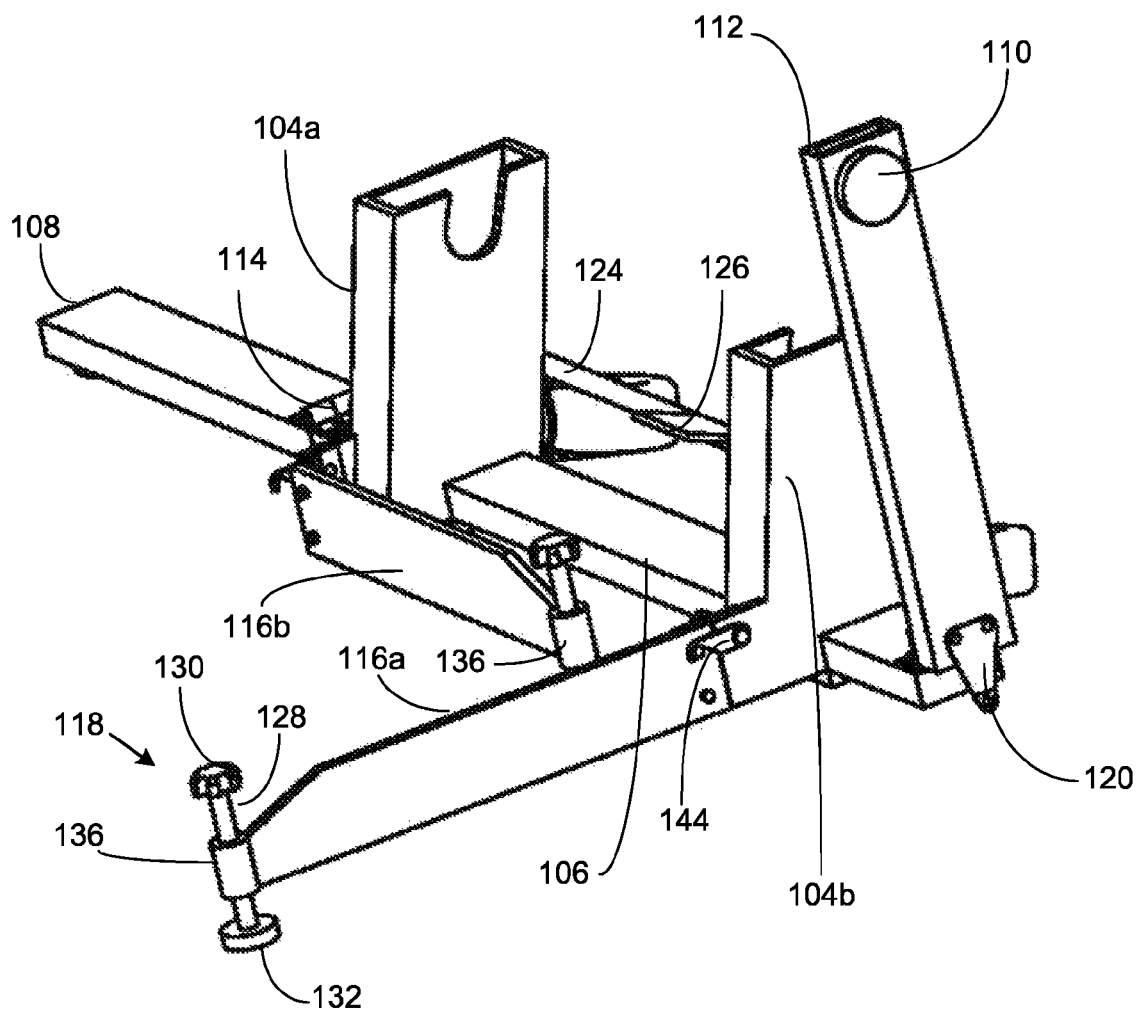
FIG. 4 is a perspective view of the mobile ladder support assembly with an exemplary rear support bar folded and an exemplary lateral support bar folded.

As illustrated in FIG. 4, during transport or storage, each lateral end may fold up, generally parallel to the sleeves 104a-b. In this manner, space usage is minimized. The second lateral end 112 may include a lateral bar hinge 114 that enables the folding. A lateral bar brace 120 restricts the folding by traversing a break in the lateral support bar 106 where the fold occurs. The lateral bar brace 120 may include brace screws that can be affixed or removed to release the lateral bar brace 120 to enable folding. The folding is useful during transport or stowage of the assembly 100.

Those skilled in the art will recognize that a ladder 200 tipping backwards is common when operating a ladder 200 from a high elevation because the center of mass on the ladder top end is distal from the lower end support offered by the legs of the ladder 200. Thus, the assembly 100 further comprises a pair of rear support bars 116a-b that are used to provide this rear support. Each rear support bar 116a-b comprises a first rear end 134 and a second rear end 136 end.

The first rear end 134 of the rear support bars 116a-b are disposed generally perpendicular to the lateral support bar 106. In one embodiment, the first rear end 134 is disposed at an obtuse angle of about 105° relative to the sleeves 104a-b. Though other angles may be used, depending on the needs of the ladder 200.

The second rear end 136 includes a height adjustment device 118 that is disposed perpendicular to the rear support bar 116a (FIG. 6A). The height adjustment device 118 has a threaded rod 128 that enables rotatable height adjustment of the second rear end 136. The threaded rod 128 includes an adjustment end 130 and a base end 132. In one possible embodiment, a nut rotatably engages the adjustment end 130 of the threaded rod 128 to raise or lower the height adjustment device 118 for adjusting the overall height of the second rear end 136. The base end 132 may include a rubber tip that inhibits slippage by the rear support bars 116a-b.

The height adjustment device 118 is configured to provide grip against the ground surface, and also to height adjust the second rear end 136 of the rear support bars 116a-b. In this manner, the rear support bars 116a-b provides adjustable rear support for the assembly 100 to maintain the ladder 200 at a desired slope and to help prevent the ladder 200 from tipping over backwards.

Looking again at FIG. 4, the rear support bars 116a-b may be configured to fold inwardly, parallel to the lateral support bar 106. In this manner, space usage is minimized. During transport or storage, each rear end 134, 136 may fold up, generally parallel to the lateral support bar 106. In this manner, space usage is minimized. The second rear end 136 may include a rear bar hinge 146 that enables the folding. A rear bar brace 144 restricts the folding by traversing a break in the rear support bars 116a-b where the fold occurs.

The rear bar brace 144 may include a hook that encompasses a protrusion on the side of the rear support bars 116a-b. The hook pivots onto the protrusion to traverse the break in the rear support bar, and thereby prevents folding at the rear bar hinge 146. Conversely, the hook pivots off the protrusion to enable folding. The folding is useful during transport or stowage of the assembly 100.

As illustrated in FIG. 5, the assembly 100 may further include a pair of wheels 122a-b that join with the lateral support bar 106. In one possible embodiment, the wheels 122a-b are a pair of swiveling caster wheels 122a-b. Though, any rolling members that enable mobility may be used. The wheels 122a-b position approximately at the junction between the sleeves 104a-b and the lateral support bar 106. The wheels 122a-b pivot down onto a ground surface to achieve a mobile position 104. The wheels 122a-b may also pivot away from the ground surface, resting on the lateral support bar 106 to achieve the stationary position 102.

Turning now to FIG. 6B, a wheel base 152 provides a housing for the wheels 122a-b. The wheel base 152 fastens the wheels 122a-b to the lateral support bar 106. The wheel base 152 includes an axle end 160 and a mount end 162. The axle end 160 includes an axle 164 that passes through a hole in the wheels 122a-b. The wheels 122a-b rolls freely on the axle 164. The mount end 162 of the wheel base 152 is defined by a plate 166 that fastens to the surface of the lateral support bar 106. A fastener, such as a screw restrains the plate 166 into the lateral support bar 106. In one embodiment, the mount end 162 rotates freely while fastened to the lateral support bar 106. The plate 166 comprises a notch 168. The notch 168 selectively enables retention of the wheels 122a-b in the stationary position 102, and release of the wheels 122a-b in the mobile position 104.

Those skilled in the art will recognize that the capacity of the wheels 112a-b to rotate and swivel freely creates a center of mass that enables the wheels 122a-b to fall towards the ground surface, in the mobile position 104. A force must be applied to the wheels 122a-b and the wheels 122a-b must be fastened into place to pivot the wheels away from the ground surface, and thereby return to the stationary position 102.

In one embodiment, a pivot bar 124 extends parallel to the lateral support bar 106. The pivot bar 124 is defined by a lever 126, a first pivot bar end 148, and a second pivot bar end 150. The first and second pivot bar ends 148,150 pass through a respective flange 142 that extends from each sleeve. In this manner, the pivot bar 124 extends parallel to the lateral support bar 106, between the sleeves 104a-b. The first and second pivot bar ends 148,150 include a tab 158 that extends outwardly and aligns with the notch 168 in the plate 166 of the wheel base 152.

A pair of springs 154a-b secure to each of the pivot bar ends 148,150. A pair of end caps 156 may be used to secure the springs 154a-b into place through the flange 142 at the sleeves 104a-b. The springs 154a-b apply a tension on the pivot bar 124 to rotate the pivot bar 124 in a first direction. The rotation in the first direction presses the tab 158 from each pivot bar end 148,150 into the respective notch 168 in the plate 166 of the wheel base 152. This direct application of pressure on the plate 166 of the wheel base 152 retains the wheels 122a-b away from the ground surface, and into the stationary position 102.

The lever 126 on the pivot bar 124 may be depressed to displace each tab 158 from its respective notch 168 in the plate 166 of the wheel base 152. When the tab 158 disengages from the notch 168, the center of mass from the wheel base 152 rotates the pivot bar 124 in a second direction, and thereby drops the wheels 122a-b to the ground surface, and into the mobile position 104. It is significant to note that the weight of the wheels 122a-b, especially the free moving center of mass of a freely rotating and swiveling caster wheel, is especially effective for weighing down on the wheels 122a-b to drop to the mobile position 104.

Once the wheel base 152 is engaged with the ground surface, the weight of the ladder 200 rests directly on the wheel base 152. However, the wheels 122a-b are not forced towards the stationary position 102 because the notch 168 engages the wheel base 152, and restricts it from pivoting up to the stationary position 102. The lever 126 may be depressed to rotate the pivot bar 124, and thereby displace the notch 168, such that the tension in the springs 154a-b rotates the pivot bar 124 in the first direction, and thereby the stationary position 102.

While the inventor's above description contains many specificities, these should not be construed as limitations on the scope, but rather as an exemplification of several preferred embodiments thereof. Many other variations are possible. For example, the lateral support bar 106 may also be height adjustable, in similar fashion to the rear support bars 116a-b. Accordingly, the scope should be determined not by the embodiments illustrated, but by the appended claims and their legal equivalents.

What is claimed is:

1. A mobile ladder support assembly for selectively moving between a stationary position to support a ladder, and a mobile position to transport the ladder, the assembly comprising:

a pair of sleeves, the pair of sleeves having a sleeve first end and a sleeve second end;

a lateral support bar, the lateral support bar having a first lateral end and a second lateral end, the lateral support bar disposed at an angle to the pair of sleeves, the lateral support bar configured to restrict lateral tilting by the assembly, the first lateral end and the second lateral end configured to hingedly fold generally parallel to the pair of sleeves;

a pair of rear support bars, each rear support bar has a first rear end and a second rear end, the pair of rear support bars disposed generally perpendicular to the lateral support bar, the pair of rear support bars configured to help restrict rearward tilting by the assembly, the first rear ends and the second rear ends configured to hingedly fold generally parallel to the lateral support bar, the second rear ends having a height adjustment device, the height adjustment device configured to adjust to a height of the second rear ends;

a pair of wheels, the pair of wheels configured to pivot between a stationary position and a mobile position, the pair of wheels further configured to rotate and swivel freely, wherein the stationary position disables the pair of wheels from transporting the assembly, wherein the mobile position enables the pair of wheels to transport the assembly;

a pair of wheel bases, each wheel base has an axle and a mount end, each axle end configured to join with each wheel, each mount end configured to join with the lateral support bar, the mount ends having a plates, the plate having a notch, a pivot bar, the pivot bar having a first pivot bar end and a second pivot bar end, the pivot bar disposed generally parallel to the lateral support bar, the pivot bar configured to pivot in a first direction and a second direction;

a pair of springs, a first spring disposed at the first pivot bar end and a second spring at the second pivot bar end, the pair of springs configured to exert a tension on the pivot bar, the tension operable to rotate the pivot bar towards the first direction; and a pair of tabs, a first tab is disposed at the first pivot bar end and a second tab at the second pivot bar end, each tab is configured to engage each notch in each wheel base when the pivot bar is rotated in the first direction, wherein the pair of tabs retains the pair of wheels in the stationary position, the pair of tabs further configured to disengage the notches in the pair of wheel bases when the pivot bar is rotated in the second direction, wherein the free rotation and swiveling of the pair of wheels forms a center of mass that pivots the pair of wheels to the mobile position.

2. The assembly of claim 1, wherein the assembly is configured to support a ladder.

3. The assembly of claim 2, wherein the sleeve first ends are configured to receive a pair of legs from the ladder.

4. The assembly of claim 3, wherein the sleeve second ends have a flange, the flange configured to receive the first pivot bar end or the second pivot bar end.

5. The assembly of claim 4, wherein the angle between the lateral support bar and the pair of sleeves is about 75°.

6. The assembly of claim 5, wherein the first lateral end and the second lateral end have a lateral bar hinge, the lateral bar hinge configured to enable folding of the lateral support bar, generally parallel to the pair of sleeves.

7. The assembly of claim 6, wherein the first lateral end and the second lateral end have a lateral bar brace, the lateral bar brace configured to restrict folding of the lateral support bar, generally parallel to the pair of sleeves.

8. The assembly of claim 7, wherein the first rear end and the second rear end have a rear bar hinge, the rear bar hinge configured to enable folding of the pair of rear support bars, generally parallel to the lateral support bar.

9. The assembly of claim 8, wherein the first rear end and the second rear end have a rear bar hinge, the rear bar hinges configured to restrict folding of the pair of rear support bars, generally parallel to the lateral support bar.

10. The assembly of claim 9, wherein the second rear end is height adjustable through rotatable manipulation of the height adjustment device.

11. The assembly of claim 10, wherein the height adjustment device has a threaded rod, the threaded rod having an adjustment end and a base end, wherein a nut rotatably engages the adjustment end of the threaded rod for height adjustment of the second rear end.

12. The assembly of claim 11, wherein the base end of the threaded rod is configured to provide a grip for the height adjustment base.

13. The assembly of claim 12, wherein the pair of wheels are caster wheels.

14. The assembly of claim 13, wherein the pair of wheels engage a ground surface in the mobile position.

15. The assembly of claim 14, wherein the pair of wheels disengage from a ground surface in the stationary position.

16. The assembly of claim 15, further including a fastener, the fastener configured to fasten the plate of the wheel base to the lateral support bar, wherein the wheel base swivels freely on the fastener.

17. The assembly of claim 16, further including a lever, the lever disposed to join the pivot bar, the lever configured to enable pivoting of the pivot bar in the first direction and the second direction.

18. The assembly of claim 17, wherein the axle end of the wheel base has an axle, the axle configured to pass through the pair of wheels, wherein the pair of wheels rotate freely on the axle.

19. The assembly of claim 18, further including a pair of end caps, each end cap disposed to join with the first pivot bar end and the second pivot bar end, each end cap is configured to retain each spring on a respective pivot bar end.

* * * * *